US007926246B2

(12) United States Patent
Cullen (10) Patent No.: US 7,926,246 B2
(45) Date of Patent: Apr. 19, 2011

(54) MOBILE BAGGING MACHINE TUNNEL

(75) Inventor: Steven Cullen, Astoria, OR (US)

(73) Assignee: SRC Innovations, LLC, Chinook, WA (US)

( * ) Notice: Subject to any disclaimer, the term of this patent is extended or adjusted under 35 U.S.C. 154(b) by 0 days.

(21) Appl. No.: 12/060,464

(22) Filed: Apr. 1, 2008

(65) Prior Publication Data

US 2009/0241488 A1    Oct. 1, 2009

(51) Int. Cl.
*B65B 43/08* (2006.01)
(52) U.S. Cl. ............... 53/576; 53/530; 53/570
(58) Field of Classification Search .......... 53/436, 53/438, 439, 459, 523, 526, 527, 529, 530, 53/567, 576, 570
See application file for complete search history.

(56) References Cited

U.S. PATENT DOCUMENTS

| | | | | | |
|---|---|---|---|---|---|
| 3,744,081 | A | * | 7/1973 | Miller | 15/257.1 |
| 3,998,415 | A | * | 12/1976 | D'Antonio et al. | 15/257.1 |
| 5,127,538 | A | * | 7/1992 | Bach | 248/101 |
| 5,419,102 | A | * | 5/1995 | Inman et al. | 53/567 |
| 5,574,767 | A | * | 11/1996 | Hayes | 378/167 |
| 6,672,034 | B1 | * | 1/2004 | Wingert | 53/436 |
| 7,131,615 | B1 | * | 11/2006 | Bruce | 248/127 |
| 7,396,996 | B1 | * | 7/2008 | Shotey et al. | 174/67 |

* cited by examiner

*Primary Examiner* — Christopher Harmon
(74) *Attorney, Agent, or Firm* — Repu Trust, LLC (57) ABSTRACT

Mobile bagging machine systems and methods may relate to a mobile bagging machine that includes a variable-width tunnel, a variable-speed rotor, a relatively narrow rotor of large diameter and increased effective surface area, at least one material reservoir, a material conveyor system capable of continuous material processing during exchange of unloading vehicles, and/or an overall width less than approximately three meters.

13 Claims, 9 Drawing Sheets

MOBILE BAGGING MACHINE TUNNEL

RELATED APPLICATIONS

The present application relates to the following co-pending patent applications, which are commonly-assigned to SRC Innovations LLC, include the common inventor Steven Cullen, and are filed simultaneously herewith on Apr. 1, 2008: "Mobile Bagging Machine," "Mobile Bagging Machine Rotor Assembly and Transmission," and "Movable Feed Table and Radiators."

BACKGROUND

The present disclosure relates to bagging machine systems and methods for bagging organic and other materials such as silage, compost, grain, sawdust, dirt, sand, and other materials.

Agricultural feed bagging machines have been employed for several years to pack or bag silage or the like into elongated plastic bags. In recent years, the bagging machines have also been used to pack or bag compost material and grain into the elongated plastic bags. Two of the earliest bagging machines are disclosed in U.S. Pat. Nos. 3,687,061 and 4,046,068, the complete disclosures of which are incorporated herein by reference for all purposes. In these bagging machines, silage or the like is supplied to the forward or intake end of the bagging machine and is fed to a rotor or other compression means, which conveys the silage into a tunnel on which the bag is positioned so that the bag is filled. The bagging machine moves forward at a controlled rate leaving the packed bag behind. The packing density of the material packed in the bag is determined and controlled by a number of factors including the rate at which the bagging machine moves forward and the rate at which the silage material is packed into the bag.

Over the past several years, bagging machines and their associated systems, methods, and components have been developed to accommodate a variety of needs. For example, bagging machines and their tunnels have dramatically increased in size to accommodate end-users' desire to use larger bags. Tunnels for use with the bagging machines are available in a variety of widths, some of which are sufficiently large to accommodate bags having a 12-foot diameter. The large width of the tunnel presents a problem when the bagging machine is being transported on public roads, which normally limit those widths to approximately 102 to 118 inches (2.5 to 3 meters) in the United States and European countries. Such width restrictions greatly reduce the mobility of machines with larger tunnels. The large width of the tunnel also presents a problem when the machines and tunnels are being shipped, especially overseas.

Another drawback with many conventional bagging machines is that they can only be used with bags of a single width. That is, conventional bagging machines can be used with bags of varying length, sometimes up to several hundred feet long. However, a bagging machine and associated tunnel typically can only be used with bags of a single width, such as 8 feet, 10 feet, 12 feet, 14 feet, or a predetermined width therebetween.

Bagging machines, whether used to bag feed, compost, or other material, can be used in a variety of circumstances and to serve multiple end-users. A particular farm may need to bag different types of silage in different size bags. The same farmer may also want to compost material in yet another size bag. Using conventional bagging technology, a separate machine, or at least separate tunnels, would be required for each such use, the cost of which would be prohibitive.

Another drawback with many conventional bagging machines is that the rotor and associated mechanical components used to in association with the rotor are often too wide to fall within preferred width range mentioned above. Many such packing machines have employed relatively wide rotors in order to produce a sufficient amount of material processed by the rotor to efficiently fill large bags.

Another drawback associated with many conventional bagging machines is that they require interruption when packing the material into a bag in order to exchange an empty unloading truck with an unloading truck full of material. During the exchange, the bagging machine must either be fully or partially turned off or permitted to run with a gap in the material being sent to the rotor. Turning the bagging machine fully or partially off and then on again risks unnecessary wear to controls an systems associated with the operation of the bagging machine. Turning the bagging machine fully or partially off and then on again also interrupts productivity of the bagging machine, thus packing less material in a given time period as a result of the interruption. Running the bagging machine when it is not processing material through the rotor also causes decreased productivity, requires unnecessary fuel consumption, produces wear upon moving parts of the system, and emits unnecessary and damaging pollution into the environment.

Another drawback associated with many conventional bagging machines is that the rotor is required to rotate at a fixed speed. However, not all materials need be processed at the same rate. For example, materials that are finer, short in fiber length, dryer, or flow better through a rotor are capable of being processed through the rotor at a more efficient and increased rotational speed while materials that are high in moister or longer in fiber length would cause potential damage to the bagging machine if processed at the same rapid speed. Such high moisture or long fiber materials would be processed more efficiently at a slower rotational speed. Conventional systems do not provide variable rotational speeds for the rotor under the same amount of torque from an engine.

Therefore, a need exists for systems and methods that address one or more of the issues discussed above.

SUMMARY

The present invention has been developed in response to problems and needs in the art that have not yet been fully resolved by currently available systems and methods. Thus, these developed systems and methods provide a mobile bagging machine that provides a variable-width tunnel, a variable-speed rotor, a relatively narrow rotor of large diameter and increased effective surface area, at least one material reservoir, a material conveyor system capable of continuous material processing during exchange of unloading vehicles, and/or an overall width less than approximately three meters.

A bagging machine for packing material into bags may include a material bagging assembly having an expandable base and/or an expandable tunnel secured to the base. The tunnel may include a first expandable portion and a second expandable portion. The base may include a first telescoping member and a second telescoping member. The first telescoping member may reside at least partially in moveable communication with the second telescoping member. The first telescoping member may slide at least partially within the second telescoping member, for example, in a manner that changes the overall combined length of the first telescoping member and the second telescoping member.

The expandable tunnel may include a central portion, a first end, a first intermediate portion, a second end and/or a second intermediate portion. The first intermediate portion may be connected to both the first end and the central portion. The second intermediate portion may be connected to both the second end and the central portion. The first expandable portion may include the first intermediate member. The second expandable portion may include the second intermediate member.

The central portion may be formed of a pliable material. The first and second ends may be formed of material that is more rigid than the material of the central portion.

The first intermediate portion may be hinged to both the first end and the central portion. The first intermediate portion may fold inwardly toward the inner cavity of the tunnel, for example, causing the central portion to overlap with the first end toward the inner cavity of the tunnel, thus placing the first expandable portion in a retracted state.

The second intermediate portion may be hinged to both the second end and the central portion. The second intermediate portion may rotate along substantially parallel hinges to form a fold between the second intermediate portion, the second end, and the central portion. The second intermediate portion may fold inwardly toward the inner cavity of the tunnel, for example, causing the central portion to overlap with the second end toward the inner cavity of the tunnel, thus placing the second expandable portion in a retracted state.

The material may be sent through the expandable tunnel. The first and second expandable portions may, when in the retracted state, remain in the retracted state as the material in the expandable tunnel forces the first and second expandable portions in a closed position. The expandable tunnel may be in a retracted or closed position when the central portion is forced against first and second intermediate portions, the first intermediate portion is forced against the inner surface of the first end, and/or the second intermediate portion is forced against the inner surface of the second end.

The expandable tunnel, first expandable portion, and/or second expandable portion may be configured to collapse from expanded states to collapsed states. The expandable tunnel may include a first hinge stop and/or a second hinge stop. The first hinge stop may prevent the first intermediate portion for rotating away from the inner cavity of the tunnel beyond a substantially coplanar relationship with the first end when the first expandable portion is in the expanded state. The second hinge stop may similarly prevent the second intermediate portion from rotating away from the inner cavity of the tunnel beyond a substantially coplanar relationship with the second end when the second expandable portion is in the expanded state.

The first and/or second telescoping members may expand and/or telescope outwards when the expandable tunnel moves from the collapsed state to the expanded state. The first and/or second telescoping members may retract and/or telescope inwards when the expandable tunnel moves from the expanded state to the collapsed state. The expandable tunnel may fit a bag having a fourteen-foot diameter when the expandable tunnel is in the expanded state. The expandable tunnel may fit a bag having a twelve-foot diameter when the expandable tunnel is in the collapsed state.

The expandable tunnel may include a forward end and a rearward end. The material bagging assembly may also include a central panel at the forward end of the expandable tunnel. The central panel may correspond in shape with the central portion. The central panel may at least partially close the inner cavity of the expandable tunnel near the central portion at the forward end of the expandable tunnel. The material bagging assembly may also include a hinge attached to the central panel and/or a hydraulic cylinder attached to the central panel.

The expandable tunnel may also include a forward end and a rearward end, and the material bagging assembly may also include a first side panel and a second side panel at the forward end of the expandable tunnel. The first side panel may expand and/or collapse to correspond in shape with the first end and at least a portion of the central panel. The first side panel may at least partially enclose the inner cavity of the expandable tunnel near the first end and central portion of the forward end of the expandable tunnel. Likewise, the second side panel may expand and/or collapse to correspond in shape with the second end and at least a portion of the central panel. The second side panel may at least partially enclose the inner cavity of the expandable tunnel near the second end and central portion at the forward end of the expandable tunnel.

The first side panel may include a first expandable side panel. The first expandable side panel may, when raised, expand the overall surface area of the first side panel enclosing the inner cavity. Similarly, the second side panel may include a second expandable side panel. The second expandable side panel may, when raised, expand the overall surface area of the second side panel enclosing the inner cavity.

A method for packing material into bags may include securing an organic material packing tunnel to a base, expanding the base by telescoping a first member of the base with a second member of the base, and/or expanding the tunnel by rotating a first intermediate portion and a second intermediate portion away from an inner cavity of the tunnel. A system for packing material into bags may include means for expanding the base of a tunnel and/or means for expanding the tunnel.

These and other features and advantages of the present disclosure may be incorporated into certain embodiments of the invention and will become more fully apparent from the following description and appended claims, or may be learned by the practice of the principles in this disclosure as set forth hereinafter. The claimed invention does not require that all the advantageous features and all the advantages described herein be incorporated into every embodiment of the claimed invention.

BRIEF DESCRIPTION OF THE SEVERAL
VIEWS OF THE DRAWINGS

In order that the manner in which the above-recited and other features and advantages of the invention are obtained will be readily understood, a more particular description will be rendered by reference to specific examples of embodiments thereof which are illustrated in the appended drawings. These drawings depict only typical examples of embodiments of the invention and are not therefore to be considered to limit the scope of the claimed invention.

DETAILED DESCRIPTION

The presently preferred embodiments of the present disclosure will be best understood by reference to the drawings, wherein like reference numbers indicate identical or functionally similar elements. It will be readily understood that the components of the present disclosure, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the claimed invention.

Referring now to FIGS. 1 through 4 simultaneously, a bagging machine is identified generally with the numeral 10. Bagging machine 10 is intended to bag organic and other material such as silage, grain, sawdust, compost, garbage, or sand within a bag. Bagging machine 10 may be configured for use with a conventional pre-folded bag, a bag that is folded as it is installed on the bagging machine such as described in U.S. patent application Ser. No. 10/350,973, filed Jan. 23, 2003, entitled "Material Bagging Machine Having a Bag Folder Mounted Thereon," or a bag that is formed from a roll of plastic material disposed on the bagging machine such as described in U.S. patent application Ser. No. 10/334,484, filed Dec. 30, 2002, entitled "A Method and Means for Bagging Organic and Other Material." The entire disclosures of the above-mentioned patent applications are incorporated herein by reference for all purposes.

Machine 10 may include a mobile frame 12, such as a chassis. Mobile frame 12 may include wheels to facilitate movement and control. In some embodiments, the wheels may be omitted. Additionally, bagging machine 10 and associated frame 12 may be truck-mounted, such as seen in U.S. Pat. No. 5,784,865, or may be self-propelled, such as illustrated in U.S. Pat. No. 5,799,472. The complete disclosures of both of these patents are incorporated herein by reference for all purposes.

For purposes of description, bagging machine 10 will be described as having a front or forward portion or end 14 and a rear or rearward portion or end 16. Machine 10 is provided with one or more material receiving assemblies or conveyors 18 at its forward end and one or more material receiving assemblies or conveyors 20 between the forward end and the rearward end. Conveyors 18 and 20 may be in the form of: (1) a feed table such as seen in U.S. Pat. No. 5,297,377; (2) a hopper such as seen in U.S. Pat. No. 5,398,736; (3) a feed mechanism such as shown in U.S. Pat. No. 5,396,753; (4) a feed mechanism such as shown in U.S. Pat. No. 5,367,860; or (5) a hopper such as seen in U.S. Pat. Nos. 5,140,802; 5,419,102; and 5,724,793. The complete disclosures of the above-mentioned patents are incorporated herein by reference for all purposes.

Material receiving assemblies 18 and 20 are configured to receive the material to be bagged and to deliver the same to a material packing assembly 22, which may be positioned at the forward end or portion of a tunnel 24. Material packing assembly 22 may be: (1) a rotor such as shown in U.S. Pat. Nos. 5,396,753; 5,297,377; 5,799,472; 5,295,554; (2) a screw conveyor such as seen in U.S. Pat. Nos. 5,140,802 or 5,419,102; (3) a plunger as seen in U.S. Pat. No. 5,724,793; or (4) the packing fingers described in U.S. Pat. No. 3,687,061. The complete disclosures of the above-mentioned patents are incorporated herein by reference for all purposes.

While not required, bagging machines 10 of the present disclosure may also include a density control assembly. A density control assembly as used herein refers to structures or devices that are coupled to the bagging machine and used to control or adjust the packing density of the material being packed into the bag. A variety of density control assemblies and methods may be implemented with the bagging machine of the present disclosure some examples of which include backstop control systems, internal control systems, and drag resistance control systems.

In early bagging machines, a backstop structure yieldably engaged the closed end of the agricultural bag to resist the movement of the bagging machine away from the filled end of the agricultural bag as silage is forced into the bag. These machines included a pair of drums rotatably mounted on the bagging machine with a brake associated therewith for braking or resisting the rotation of the drum with a selected brake force. A cable is wrapped around the drum and is connected to the backstop. Examples of such bagging machines are disclosed in U.S. Pat. Nos. 3,687,061 and 4,046,068, previously incorporated by reference.

In more recent bagging machines, an internal density control assembly including one or more cables was positioned in the flow of the agricultural material being bagged. In order to vary the packing density of the material in the machine, more or less cables would be employed based on the material being packed. In other embodiments, a single cable is employed in an arched configuration and the width of the arch is varied to vary the packing density. In still other embodiments, one or more cables are used with an anchor attached to the rearward ends thereof with the anchor being adjustable and/or the length of the cable being adjustable to control the packing density. Examples of these and other alternative configurations are disclosed in U.S. Pat. Nos. 5,297,377; 5,425,220; 5,463,849; 5,464,049; 5,517,806; 5,671,594; 5,775,069; 5,671,594; 5,857,313; 6,443,194; 6,655,116; 6,694,711; and RE38,020, the complete disclosures of which are hereby incorporated by reference for all purposes.

More recently, drag resistance density control assemblies have been developed using belts or straps disposed between the bagged material and the ground. In these embodiments, a drag member, such as one or more belts or straps, is attached to the bagging machine or the tunnel and extends rearwardly behind the tunnel. The drag member is positioned between the bagged material and the ground and may be disposed inside the bag or outside the bag. The weight of the bagged material on the drag member slows the advance of the bagging machine and increases the packing density of the agricultural material in the bag. The packing density of the material in the bag may be established prior to beginning the bagging operation or may be adjusted as the bag is being filled. The packing density is established or adjusted, at least in part, by controlling the amount of drag member surface area disposed under the weight of the bagged material. Density control assemblies for agricultural bagging machines that include drag members are disclosed in U.S. Pat. No. 6,748,724 and U.S. patent application Ser. No. 10/867,593. The complete disclosures of the above-identified patent and patent application are hereby incorporated by reference for all purposes.

Figure 1:
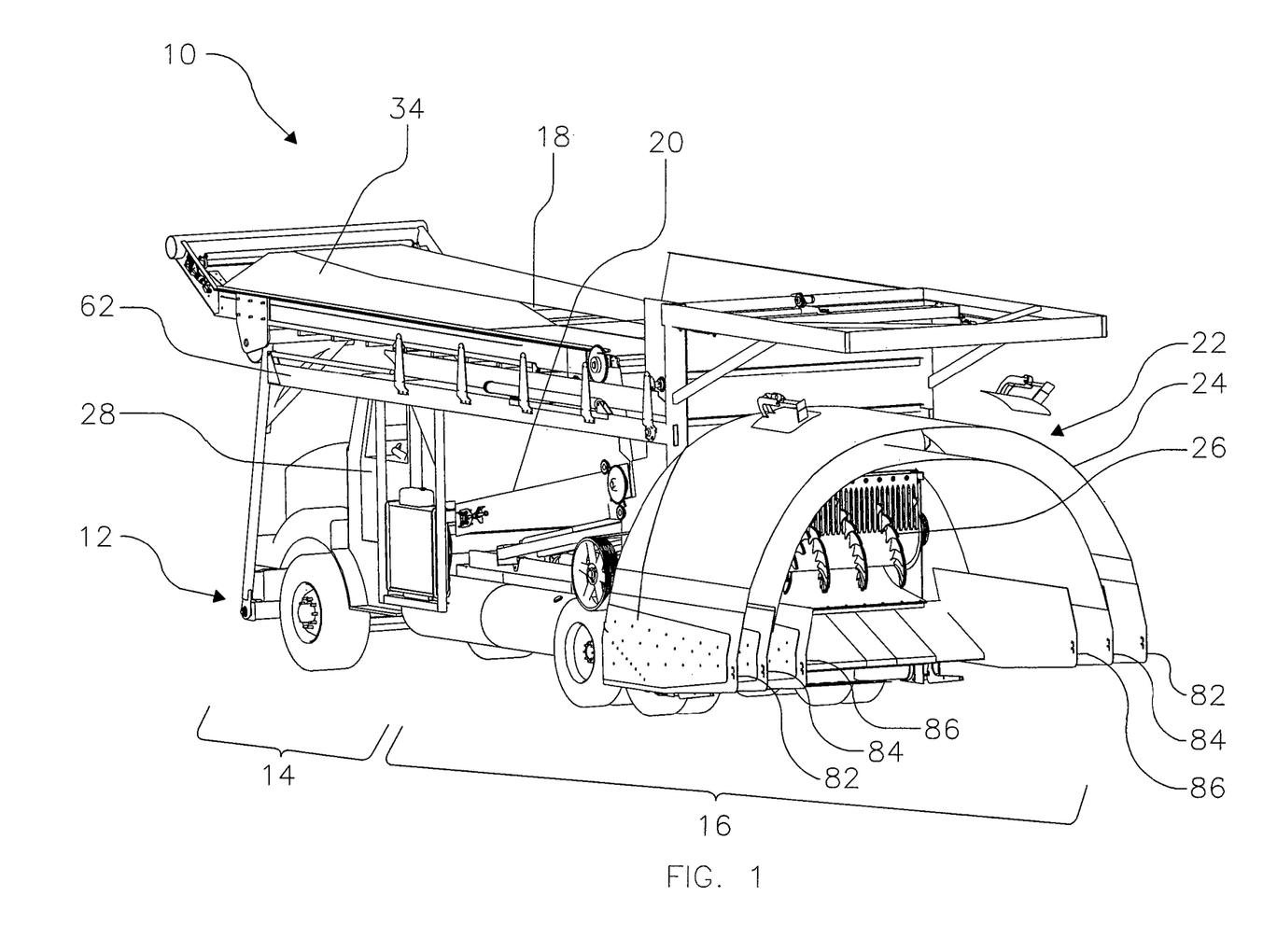
FIG. 1 is a perspective view of the side and rear portions of a bagging machine with a conveyor in a first position.

Tunnel 24 may be semi-circular, as shown in FIG. 1, or it may be square, rectangular, circular, oblong, or other such configurations. Tunnel 24 may be open at the bottom, as shown in FIG. 1, or may be at least partially closed at the bottom, as will be discussed below. As used herein, the term "tunnel" should be understood to signify a horizontal passageway open at both the forward end or portion thereof and the rearward end or portion thereof. The size of the tunnel, measured by either longitudinal length or cross-sectional area, at any particular time may be dependent on a number of factors including the diameter of the bag being filled, the type of material being bagged, the configuration of the tunnel such as semi-circular or circular, and whether bagging machine 10 is configured to be transported on a highway where machine width is a limiting factor. Various tunnels are shown in U.S. Pat. Nos. 5,899,247; 5,396,753; 5,297,377; 5,799,472; 5,398,736; 5,355,659; 5,295,554; 5,140,802; 5,419,102; 5,421,142; 5,724,793; 5,894,713, the entire disclosures of which are incorporated herein by reference for all purposes.

With continued reference to FIGS. 1 through 4, the material packing assembly 22 of the bagging machine 10 may include a rotor 26. Rotor 26 may process material received by the conveyors 18 and/or 20. The bagging machine 10 may also include a cab 28, such as an operator cab for operating the bagging machine 10. The cab 28 may be attached to the frame or chassis 12.

In addition, the bagging machine 10 may include one or more radiators 30 located behind the cab. The conveyor 18 is shown in a first position in FIG. 1 located substantially above and behind the cab 28. The conveyor 18 is shown, with reference to FIG. 2, in a second position, substantially slopping from above the cab toward the ground in front of the cab. In the second position, the conveyor 18 is capable of receiving material from an unloading vehicle 32 (FIG. 4) and transferring the material up the slope of the conveyor 18 toward the material packing assembly 22. As material is emptied from an unloading truck 32 onto the conveyor 18, debris such as dry particulants, chaff, and/or other wind-blown materials cloud the area near the front of the cab 28. The one or more radiators 30 are preferably placed behind the cab 28 in order to protect and/or isolate the one or more radiators 30 from the debris near the front of the cab 28. Failure to properly isolate the one or more radiators 30 may result in clogging the coils of the radiator such that the one or more radiators 30 become incapable of properly performing their function of cooling the engine and motor systems of the bagging machine 10.

Figure 2:
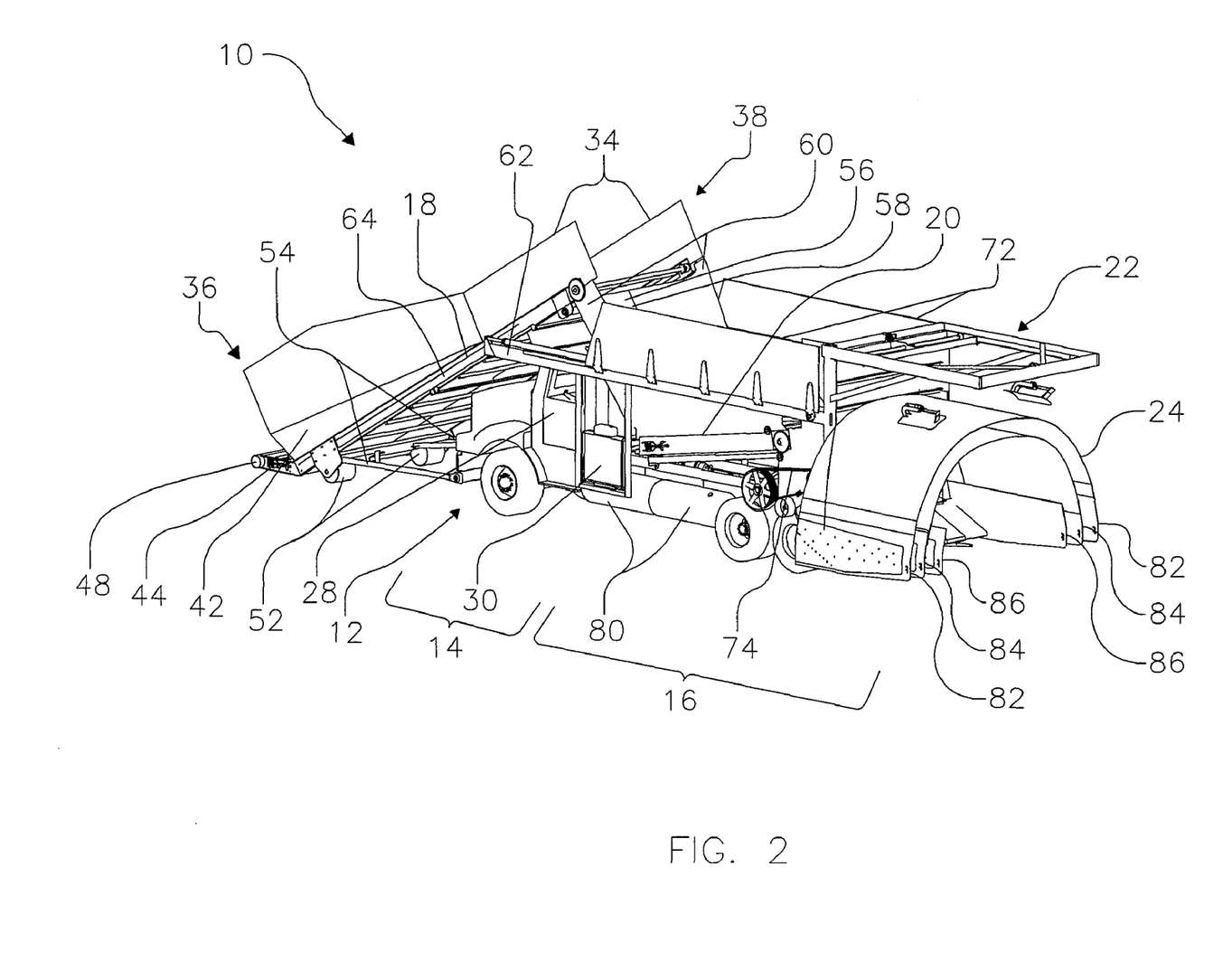
FIG. 2 is a perspective view of the side and rear portions of a bagging machine with a conveyor in a second position.

With continued focus on FIG. 2, the conveyor 18 may include one or more side panels 34. The side panels 34 may run along the length of the conveyor 18 and may decrease in height and/or width between the two side panels 34 as the side panels 34 run along the length of the conveyor 18 from a front portion 36 of the conveyor 18 toward a rear portion 38 of the conveyor 18. The increased width between the two side panels 34 at the front portion 36 of the conveyor 18 permits a relatively wide unloading vehicle 32 and its doors or gates 40 to properly dock within the two side panels 34. As material is removed from the unloading vehicle 32 onto the front portion 36 of the conveyor 18, the relatively wide distance between the two side panels 34 will ensure that substantially all of the material is received by the conveyor 18. Further, one or more funneling slides 42 of the side panels 34 direct the material toward the center of the conveyor 18. At the center of the conveyor 18, a conveyor belt or other mechanism along the length of the conveyor 18 moves the materials from the front portion 36 toward the rear portion 38.

The conveyor 18 may be angled at an incline or slope greater than thirty degrees, for example, thirty-two degrees. At thirty-two degrees, most material loaded onto the conveyor 18 will, as it moves up the incline toward the rear portion 38, tumble downwards toward the front portion 36. Such tumbling may serve to process the material as the material is moved toward the material packing assembly 22. As the material is tumbled along the conveyor 18, an increased amount of material may, as it tumbles downward, reside at or near the front portion 36 of the conveyor 18. Because the side panels 34 increase in height and width at the front portion 36 of the conveyor 18, the front portion 36 forms a reservoir of the conveyor 18 which is larger than the reservoir formed at the rear portion 38 of the conveyor 18.

The side panels 34 may also be folded along a hinge and/or pivot toward each other and the center of the length of the conveyor 18. Side panels 34 are illustrated in FIG. 1 in a folded position and in FIGS. 2 through 4 in an open position.

Conveyor 18 may also include a bottom skid 44 at the front portion 36 of the conveyor 18. The bottom skid 44 may be substantially horizontal or parallel with the ground when the conveyor 18 is placed in the second position. The bottom skid 44 may receive any material which is unloaded directly below the rear most edge of an unloading vehicle 32. A conveyor belt 46 along the length of the conveyor 18 may travel through and/or around at least a portion of the bottom skid 44. Conveyor 18 may also include a wheel and/or vehicle obstruction 48 located at the front-most portion of the conveyor 18. The obstruction 48 may operate as a wheel block or stop for the wheels 50 of an unloading vehicle 32. When the rear-most wheel 50, or other structure, of the unloading vehicle 32 comes into contact with the obstruction 48, the operator of the unloading vehicle 32 will sense resistance and will understand that the unloading vehicle 32 is likely at the proper unloading position at the front portion 36 of the conveyor 18.

The obstruction 48 also resides near the conveyor belt 46 and bottom skid 44. By residing between an unloading vehicle 32 and the conveyor belt 46, bottom skid 44, and remainder of the bagging machine 10, the obstruction 48 serves as an additional protection to the structure of the bagging machine 10. Thus, a rear wheel 50 of an unloading vehicle 32 that is in contact with the obstruction 48 may be effectively obstructed from contact with the bottom skid 44 and/or conveyor belt 46, permitting the conveyor belt 46 and the bottom skid 44 to function properly.

The obstruction 48 may also be formed in a rounded, circular, and/or wheel-like shape which, if placed in contact with the ground, is capable of being moved in a forward and/or rearward direction while the conveyor 18 is in the second position. The conveyor 18 may also include one or more support structures 52 in contact with the ground. The support structures may be capable of providing a foundation and/or platform between the ground and the remaining components of the conveyor 18 such that the conveyor 18 may rest upon the ground. The support structures 52 may be wheels and/or other structures capable of, similar to certain embodiments of the obstruction 48, moving in forward and/or rearward directions when the conveyor 18 is in the second position.

The conveyor 18 may include one or more bottom braces 54. A bottom brace 54 may secure the front portion 36 of the conveyor 18 to the forward end 14 and/or chassis 12 of the bagging machine 10. A bottom brace 54 may serve to stabilize the front portion 36 of the conveyor 18 and/or maintain a substantially fixed distance between the front portion 36 of the conveyor 18 and the front portion and/or forward end 14 of the bagging machine vehicle 10. One or more of the bottom braces may be removably attached to the conveyor 18 and/or the forward end 14 or any other portion of the bagging machine 10. Thus, the braces 54 may be attached when the conveyor 18 is in the second position and in use and detached when a conveyor 18 is not in use, needs to be moved between the second position and/or the first position, and/or resides in the first position.

Similar to the bottom braces 54, the bagging machine 10 may include a top brace 56. The top brace 56 may be located at or near the rear portion 38 of the conveyor 18. The top brace 56 may be secured to the rear portion 38 of the conveyor 18 and the remaining structure of the bagging machine 10. For example, the top brace 56 may be directly and/or indirectly secured to the chassis 12. The top brace 56 may be formed, at least partially, as a slide having a ramp 58 and/or one or more side panels 60. The ramp 58 and/or side panel 60 may form a slide, chute, channel, or other structure capable of conveying material from the rear portion 38 of the conveyor 18 toward another portion of the bagging machine 10. Further, the top brace 56 may serve to stabilize the rear portion 38 of the conveyor 18 when the conveyor 18 is in the second position. When the conveyor 18 is in the first position as shown in FIG. 1, the top brace 56 may fold downward toward the cab 28 of the bagging machine 10 to provide a path and/or space for the conveyor 18 to reside above and/or behind the cab 28.

The bagging machine 10 may include at least one fulcrum 62. The bagging machine 10 includes a very large number of moving parts, many of which are of significant weight and/or structure capable of damaging the other parts of the bagging machine 10 if such parts were permitted to come into contact with each other during movement. One of the advantages of a fulcrum 62 is to provide a pivot point on which certain portions of a bagging machine 10 may slide, pivot, and/or move without coming into potentially damaging contact with other portions of the bagging machine 10. For example, the fulcrum 62 discussed with reference to FIGS. 1 through 3 may provide a pivot point for the conveyor 18 as the conveyor 18 moves between the first position and the second position.

Figure 3:
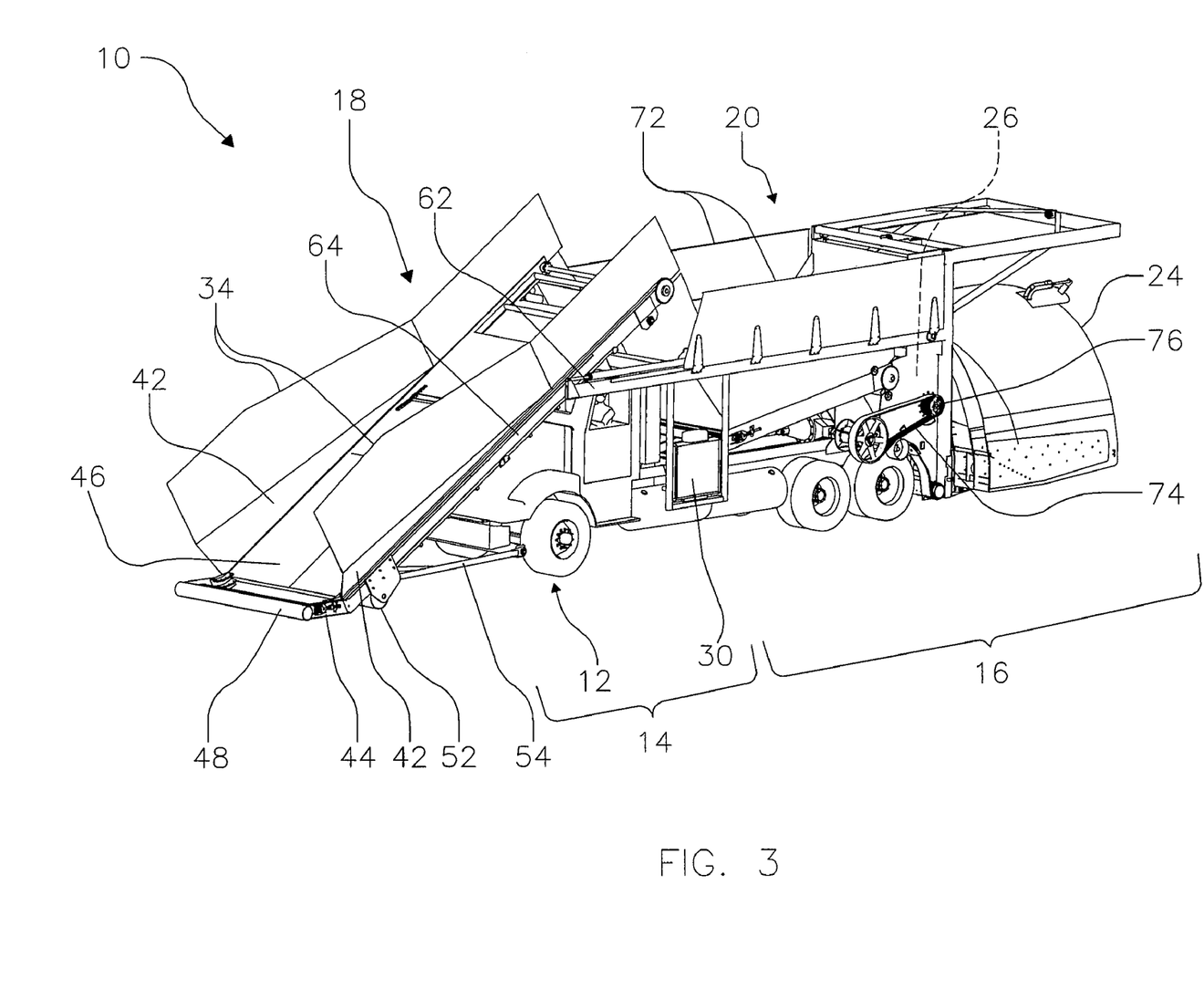
FIG. 3 is a perspective view of the side and front portions of a bagging machine with a conveyor in a second position.
Figure 4:
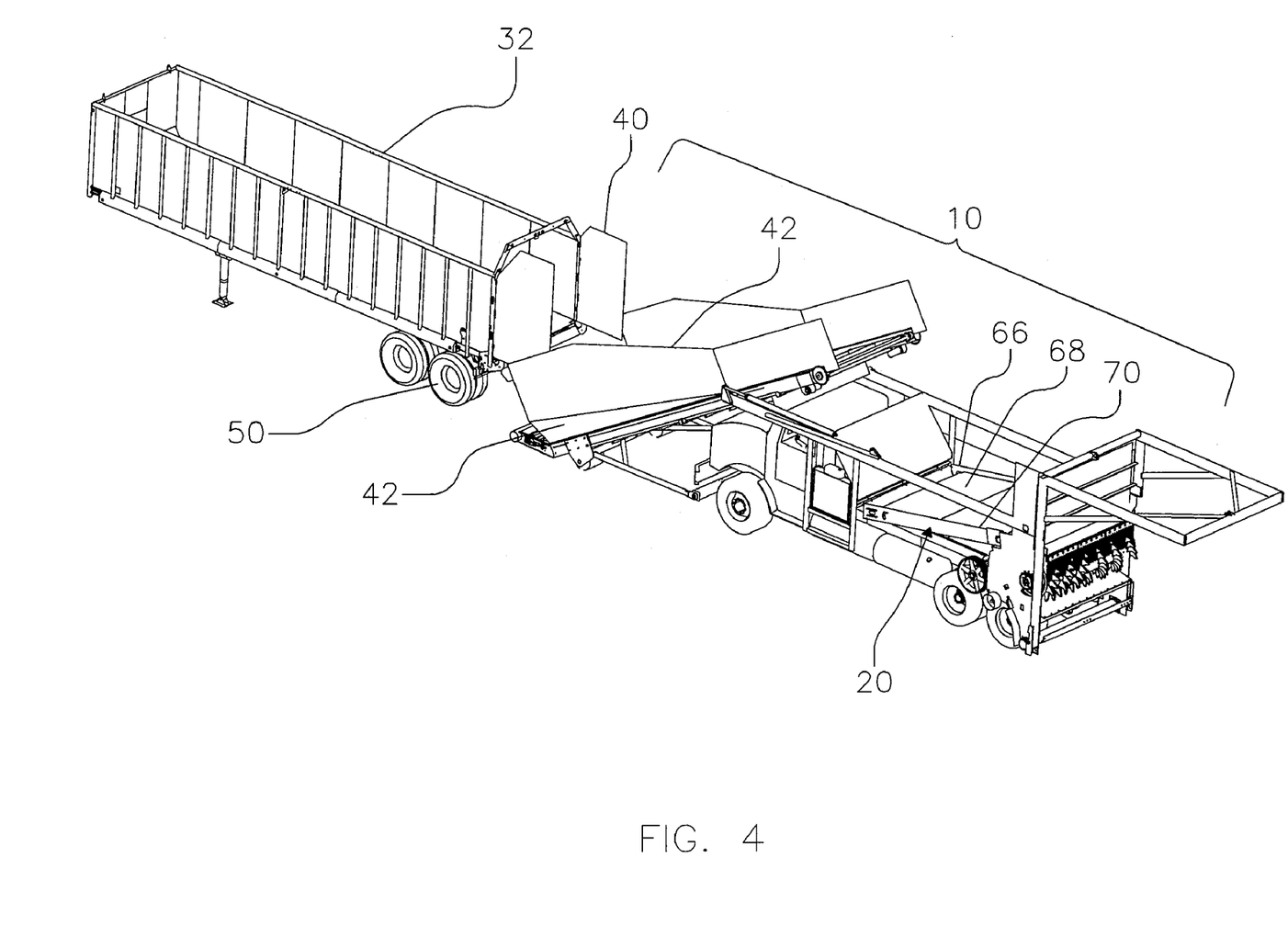
FIG. 4 is a perspective view of a bagging machine and an unloading vehicle.

The conveyor 18 may include one or more rails 64 along the length of the bottom surface of the conveyor 18. As the conveyor 18 is moved between the first and second positions, the rail 64 may come into contact with and/or slide along the pivot point of the fulcrum 62 in order to gracefully guide, direct, and/or provide a support for the weight of the relatively long conveyor 18. The fulcrum 62 is optimally positioned at a location above the cab 28 (and/or other structure of the bagging machine 10) requiring protection from the conveyor 18 as it is moved. Thus, the fulcrum 62 permits the conveyor 18 to slide along the fulcrum 62 along the first and second positions without coming into contact with the cab 28.

The conveyor 20 may include many of the same features as the conveyor 18. For example, the conveyor 20 may form a reservoir for receiving the material at a front portion 66 of the conveyor 20 and transferring the material along an upward incline using a conveyor belt 68 toward a rear portion 70 of the conveyor 20. The conveyor belts 68 and 46 discussed herein, may include any belt, escalator, track system, and/or other structure formed of rubber, metal, metal alloy, and/or other material capable of transferring a material from location to another location.

The conveyor 20 may also include one or more side panels 72 along the length of the conveyor 20. The side panels 72 may be foldable, similar to the side panels 34 of the conveyor 18. The conveyor 20 may be aligned along the length of the bagging machine 10 with the chassis 12, conveyor 18, top brace 56, and/or material packing assembly 22 in order to transport and/or process materials received from an unloading vehicle 32 from the front end 14 of the bagging machine 10 to the rear end 16 of the bagging machine 10. The conveyor 20 may be set at an upward incline capable of tumbling the material as the material is moved upward along the slope toward the packing assembly 22.

The conveyor 20 forms a large reservoir for the material which effectively doubles, or otherwise significantly increases, or the material reservoir capacity of the bagging machine 10. The increased reservoir capacity and material tumbling abilities of the bagging machine 10 adapt the bagging machine to receive the material from at least two unloading vehicles and to convey the material from the two separate unloading vehicles 32 continuously toward the material packing assembly 22 without interruption between an exchange of the unloading vehicle 32.

In other words, as a first unloading vehicle 32 empties, the loading vehicle 32 is removed from its position at the front portion 36 of the conveyor 18. For a brief period, the conveyor 18 does not receive any materials from any unloading vehicle 32. However, during this time, the conveyor 18 and conveyor 20 continue to tumble, process, and/or convey the material from the first unloading vehicle 32 toward the material packing assembly 22.

Later, a second unloading vehicle is docked and placed directly in front of the front portion 36 of the conveyor 18. The material from the second unloading vehicle 32 is then loaded onto the conveyor 18, providing additional material to the bagging machine 10. This additional material from the second unloading vehicle 32 combines with the material of the first unloading vehicle 32 which is currently tumbled, processed, and/or conveyed along conveyors 18 and/or 20. The combination of the two groups of materials provides a continuous, uninterrupted flow of material into the material packing assembly 22. In this manner, the conveyors 18 and/or 20 operate as staging reservoirs for the material as loading of the material on the conveyor 18 is interrupted between the exchange of unloading vehicles 32.

As discussed previously, and with continued reference to FIGS. 1 through 4, the material packing assembly 22 may include a rotor 26. The rotor 26 may be powered by two differential-driven belts 74 applying torque to two planetary gear boxes 76 housed within the central cavity of the rotor. The two differential-driven planetary gear boxes 76 are capable of providing a conversion of torque to speed using a variety of separate gears and gear ratios. By converting torque into various speeds, the two planetary gear boxes 76 are capable of driving the rotational speed of the rotor 26 at different revolutions-per-minute. For example, in one embodiment, one or more planetary gear boxes 76 may drive the rotor 26 speed as slow as fifteen revolutions-per-minute and as fast as sixty revolutions-per-minute.

The cab 28 may include operator controls such as a rotor operation control, a first conveyor operation control, and a second conveyor operation control. The conveyor operation controls may operate the speed and/or power of the conveyors 18 and/or 20. Likewise, the rotor operation control may control the power, torque, and/or speed applied to the rotor 26. The transmission and planetary gear boxes 76, also referred to herein as gear assemblies, may be adapted to process a maximum amount of material through the rotor 26 using a minimum amount of torque and minimum revolutions-per-minute of the rotor. A transmission employed by the bagging machine 10 may be, for example, automatic and/or manual.

Figure 5:
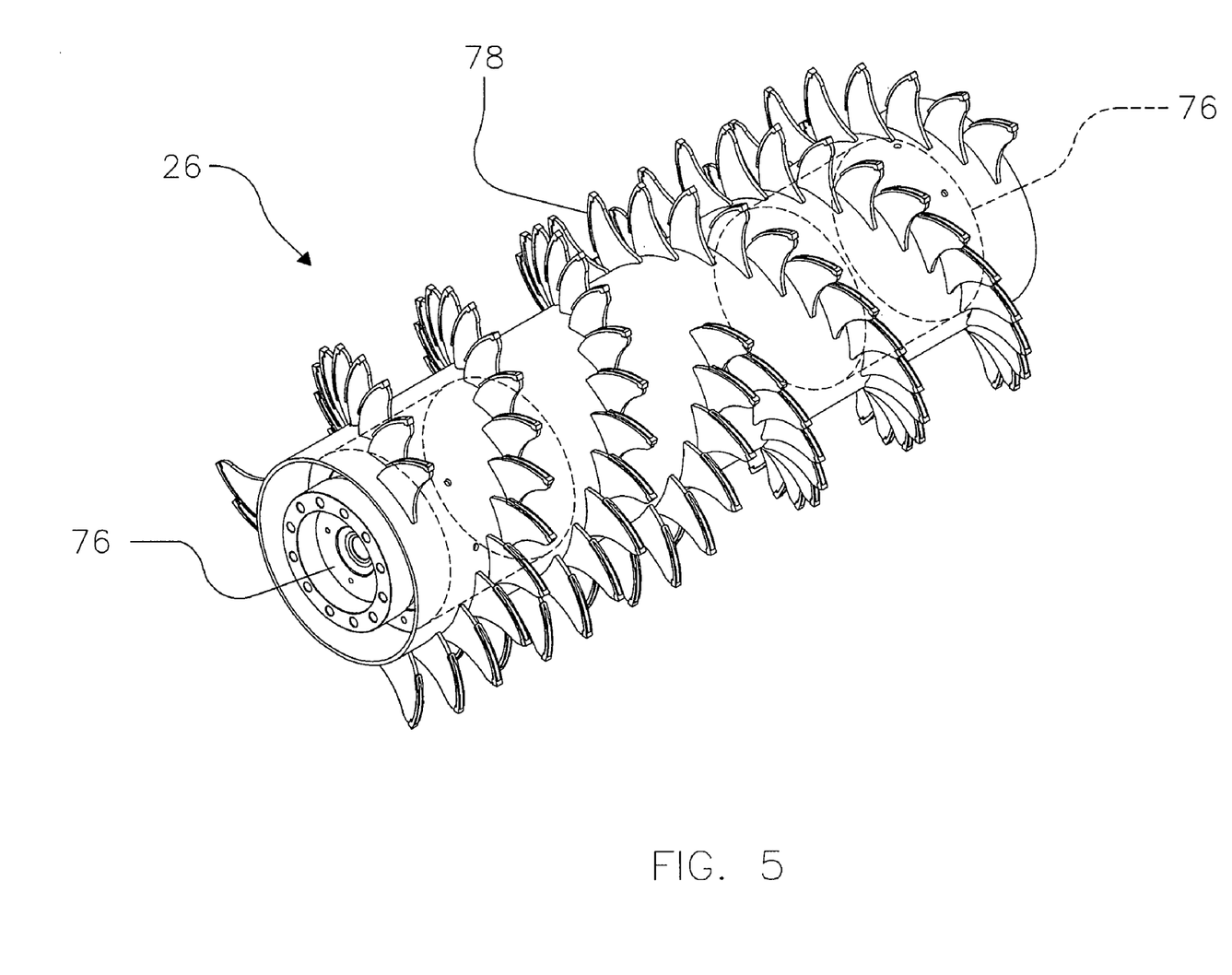
FIG. 5 is a perspective view of a rotor.

With continued reference to FIGS. 1 through 4, and with additional reference to FIG. 5, the rotor 26 may be a relatively large diameter rotor capable of housing one or more planetary gear boxes 76 or other gear assemblies within the cavity of the rotor. The rotor may also be relatively large in diameter in order to minimize the width of the rotor 26 while maximizing the total effective surface area of the rotor 26 capable of processing the material through the material packing assembly 22 and into the tube 24. For example, conventional rotors are typically approximately 132 inches wide and 22 inches in diameter when measuring the outside diameter of the swing of the teeth. By contrast, the rotor of the present invention may be approximately 100 inches wide and 30 to 50 inches in diameter. For example, the rotor 26 may be approximately 40 inches in diameter when measured from the outside diameter of the teeth 78 attached to the rotor 26. The teeth 78 of the rotor may reside on a rotor pipe that is approximately 26 inches in diameter with a ½ inch thick wall. In order to maximize material processing, the relatively large diameter rotor 26 provides a surface area for three symmetrical patterns of tines or teeth 78 arranged along the outer surface of the rotor 26.

In embodiments where the transmission system of the bagging machine 10 is automatic, the transmission may automatically shift from one gear into another gear when the material in contact with the rotor 26 causes an increase in resistance against the rotating direction of the rotor 26. This shift from one gear to another may slow the rotational speed of the rotor 26 under the same amount of torque, increasing the power of rotor 26 to enable it to process the material having an increased resistance to the rotor 26. Likewise, an automatic transmission may automatically shift from one gear to another gear when the material in contact with the rotor 26 causes a decrease in resistance against the rotating direction of the rotor 26. In this example, the rotational speed of the rotor 26 may increase until a desired amount of resistance between the material and the rotational direction of the rotor is reached. Similarly, an operator within the cab 28 or operating a transmission control located elsewhere on the bagging machine 10 may manually shift the transmission from one gear to another gear in order to adjust the rotational speed of the rotor 26. In the examples above, the transmission may be powered by the motor of the bagging machine 10 to convert torque from the motor to different rotational speeds of the rotor 26.

Various auxiliary systems and structures may provide the necessary operational support to any system or component of the bagging machine 10. For example, fuel tanks 80 may provide reservoirs for one or more motors or engines of the bagging machine 10. Additionally, hydraulic power systems may exist in order to move and/or control the movement of various components of the bagging machine 10, such as the conveyor 18 from between the first position and the second position, the operation of the material packing assembly 22 and/or the size, movement, and/or operation of the tunnel 24.

After the material is processed, mashed, and/or shredded into small fibers by the teeth 78 of the rotor 26 from the material packing assembly 22, the material enters into the central chamber or cavity of the tunnel 24. As previously discussed, a tunnel of the bagging machine 10 will optimally be capable of resizing between larger and smaller diameters. Thus, the tunnel 24 is capable of moving, for example, from a diameter of approximately 14 feet to a diameter of approximately 12 feet and further to an even narrower diameter of approximately 118 inches (or less than 10 feet) for transportation within a single lane of freeways and/or highways on American, European and/or other roads. FIGS. 1 and 2 illustrate the three different positions of a 14-foot width 82, a 12-foot width 84, and a 118-inch width 86. Thus, the bagging machine 10 includes and inline conveyor system of conveyor 18 and conveyor 20, a narrow rotor 26 with internal planetary gear boxes 76, and/or an expandable and collapsible tunnel 24 which provide a relatively narrow width of the bagging machine 10. In one embodiment, the mobile bagging machine 10 is less than about 118 inches wide at its widest point.

Figure 6:
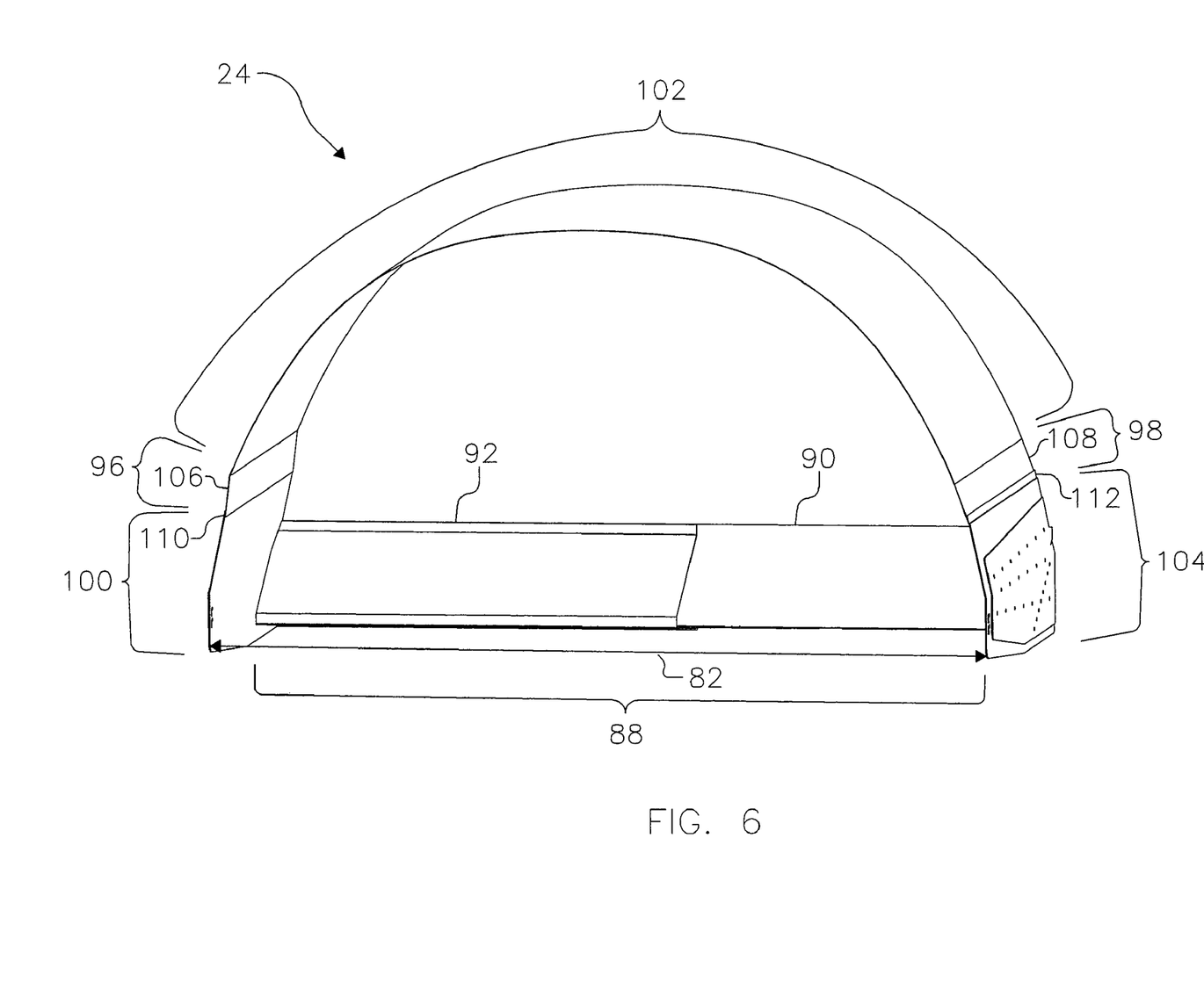
FIG. 6 is a perspective rear view of an expanded tunnel.

The expandable, collapsible, and/or retractable tunnel 24 will now be discussed in greater detail and with simultaneous reference to FIGS. 6 through 8. Referring to FIG. 6, a tunnel 24 expanded to a width 82 of 14 feet is shown. The tunnel 24 is an expandable, collapsible, and/or retractable tunnel. The tunnel 24 may include an expandable base 88 and an expandable tunnel portion secured to the base 88. The expandable base 88 may include a first telescoping member 90 and a second telescoping member 92. The first telescoping member 90 may reside at least partially in movable communication with the second telescoping member 92. For example, the first telescoping member 90 may slide at least partially within the second telescoping member 92 in a manner that changes the overall combined length of the first telescoping member 90 and second telescoping member 92 forming the expandable base 88.

The expandable base 88 serves to provide structural support for the remaining portion of the tunnel 24. In addition, the expandable base 88 may provide a downward sloping ramp for receiving and/or transferring the material received from the rotor 26 and packing assembly 22 of the bagging machine 10. As the material slides down the downward slopping ramp of the expandable base 88, the material advances to a rearward end of the tunnel 24 and into a bag or other receptacle for the material.

Figure 8:
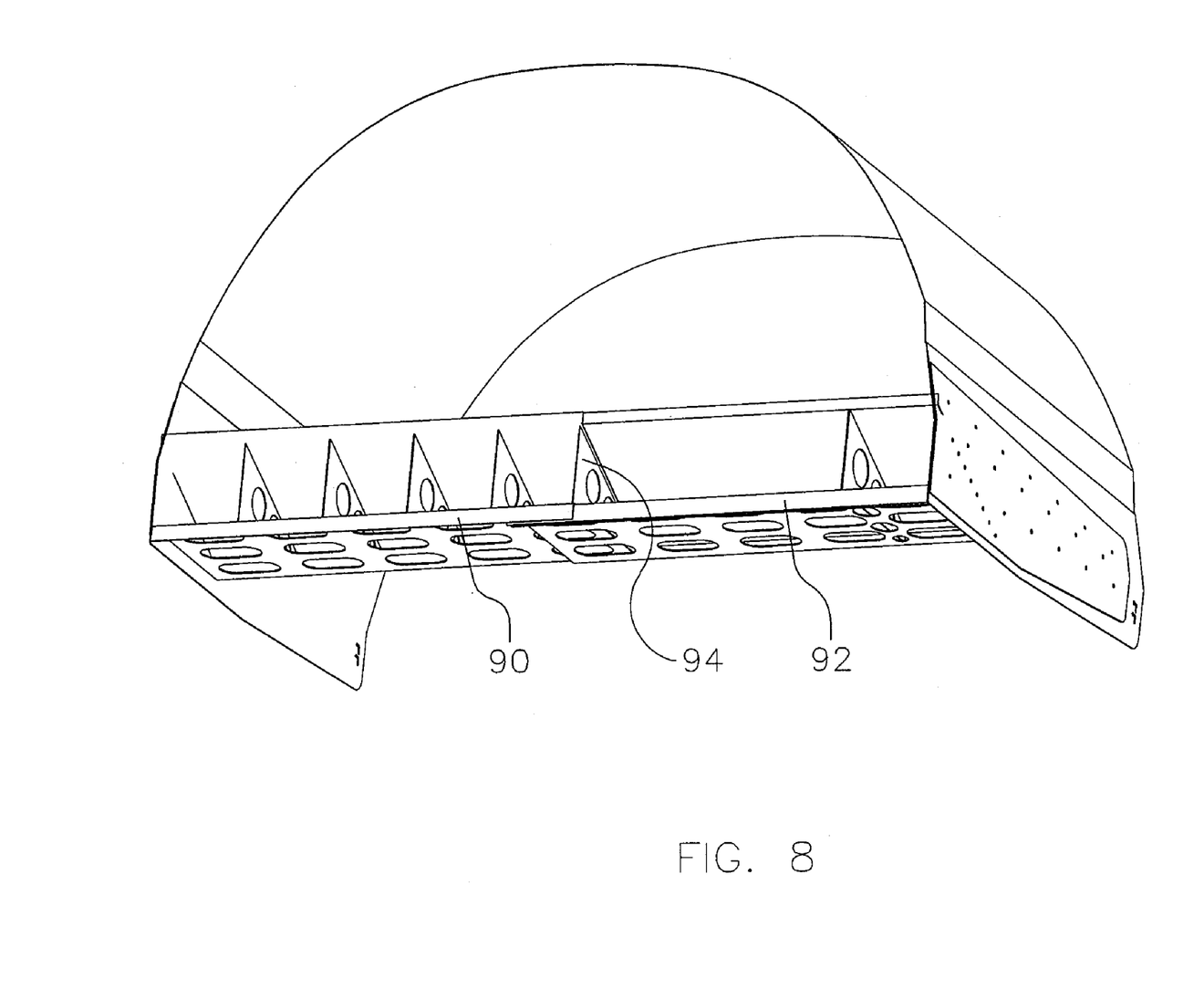
FIG. 8 is a perspective front view of a tunnel.

Referring simultaneously to FIGS. 6 and 8, each of the telescoping members 90 and 92 of the base 88 may require one or more support structures 94 within the base 88. The one or more support structures 94 may be formed within either of the telescoping members 90 and/or 92. The support structures 94 are capable of maintaining the shape of the downward slopping ramp of the base 88 under the weight and pressure of material processed by the packing assembly 22. The support structures should be configured to enable interlocking material of either of the telescoping members 90 and/or 92 to interlock with material of the other telescoping member in a manner that ensures smooth telescoping movement between the first telescoping member 90 and the second telescoping member 92.

Referring primarily to FIG. 6, the expandable tunnel may also include a first expandable portion 96 and a second expandable portion 98. The first expandable portion 96 and/or second expandable portion 98 may include structure capable of modifying, collapsing and/or retracting the overall internal width, diameter, and/or volume of the tunnel 24.

The entire outer arch of the tunnel 24 may be formed of a first end 100, the first expandable portion 96, a central portion 102, the second expandable portion 98, and/or a second end 104. The first expandable portion 96 may include a first intermediate portion 106. The first intermediate portion may be connected to the first end 100, and the central portion 102. The second expandable portion 98 may include a second intermediate portion 108. The second intermediate portion may be connected to the second end 104 and central portion 102.

The central portion 102 of the tunnel 24 may be formed of a flexible and/or pliable material such as a thin sheet of aluminum. The first and/or second ends 100 and/or 104 may be formed of a material such as a metal that is more rigid and/or less flexible or pliable than the material of the central portion 102. The first intermediate portion 106 and second intermediate portion 108 may both be secured to the central portion 102 by means of a hinge or similar movable, connection. Similarly, the intermediate portion 106 may secure by means of a hinge or similar connection to the first end 100, and the second intermediate portion 108 may be hinged or otherwise secured to the second end 104. The first end 100 and/or second end 104 may include a first movement stop 110 and/or a second movement stop 112, respectively. The movement stops 110 and 112 may include any structure near and/or integrated with the hinge between the first and second intermediate portions 106 and 108 and their corresponding first and second ends 100 and 104. The first end and/or second movement stops 110 and/or 112 may for example be a hinge stop. The hinge stop, in this particular embodiment discussed with reference to FIG. 6, is a flap of material overlapping on the outside surface of the bottom portion of either the first intermediate portion 106 and/or second intermediate portion 108.

The hinge stops prevent the first and/or second intermediate portions 106 and/or 108 from rotating away from the inner cavity of the tunnel 24 beyond a substantially coplanar relationship with the first and/or second ends 100 and/or 104 when the first and/or second expandable portions 106 and/or 108 are in an expanded state. As shown in FIG. 6, with the width 82 of 14 feet, the first and/or second intermediate portions 106 and/or 108 are shown in their expanded state. Similarly, the first and second telescoping members 90 and 92 are shown in FIG. 6 as expanded and telescoped outwards enabling the width 82 of the tunnel 24 to be approximately 14 feet.

Figure 7:
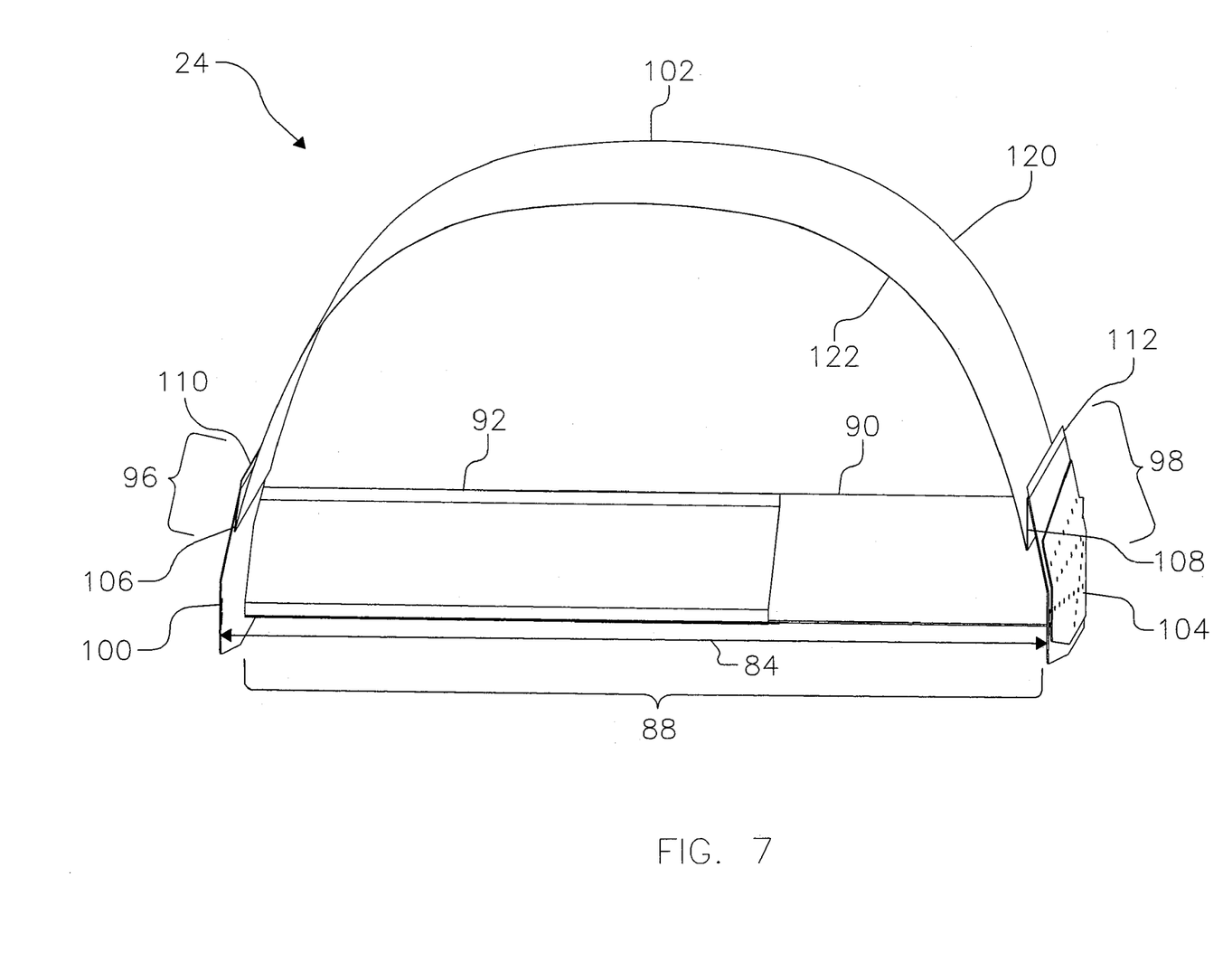
FIG. 7 is a perspective rear view of a retracted tunnel.

Referring to FIG. 7, the tunnel 24 may move from its expanded state as shown in FIG. 6 to a collapsed or retracted state as shown in FIG. 7. In the collapsed or retracted state, the first intermediate portion 106 and/or second intermediate portion 108 have rotated toward the inner cavity of the tunnel 24 along substantially parallel hinges between the central portion 102 and the first and/or second ends 100 and/or 104 respectively. The first and/or second intermediate portions 106 and/or 108 have rotated inward along the parallel hinges to form one or more folds between the central portion 102 and the first end 100 and/or second end 104.

When one or more folds are formed by the intermediate portions 106 and/or 108, the central portion 102 overlaps with the first end 100 and/or second end 104 toward the inner cavity of the tunnel 24. When the central portion 102 is overlapped toward the inner cavity of the tunnel 24, the first end and/or second expandable portions 96 and/or 98 are placed in a retracted state.

In the retracted or collapsed state, the tunnel 24 may include an internal width and/or diameter 84 of approximately 12 feet. When the expandable tunnel 24 is in its expanded state as shown in FIG. 6, a large organic material packing bag may be used in connection with the tunnel 24. When the expandable tunnel 24 is in its collapsed or retracted state as shown in FIG. 7, the expandable tunnel 24 may be used in connection with a small organic material packing bag. Organic material packing bags larger than 14 feet and smaller than 12 feet in diameter may be used in connection with the expandable tunnel 24.

With continued reference to FIG. 7, the expandable tunnel 24 in its retracted state may include one or more folds along the first expandable portion 96 and/or second expandable portion 98. Further, the expandable base 88 may be collapsed and/or retracted by sliding the first telescoping member 90 and second telescoping member 92 together such that, in this particular example embodiment, the total overall length of the first and second telescoping members 90 and 92 of the expandable base 88 are approximately 12 feet in length.

When the first and/or second expandable portions 96 and/or 98 are placed in a folded and/or retracted or collapsed state, the material within the inner chamber of the tunnel 24 may force the central portion 102 against the first and/or second intermediate portions 106 and/or 108. The first and/or second intermediate portions 106 and/or 108 are then in turn forced against the respective inner surfaces of the first end 100 and the second end 104. In this manner, densely-packed material residing within the inner chamber of the expandable tunnel 24 in its collapsed state will cause the tunnel 24 to remain in its collapsed state until the material is removed from the inner chamber of the tunnel 24.

Figure 9:
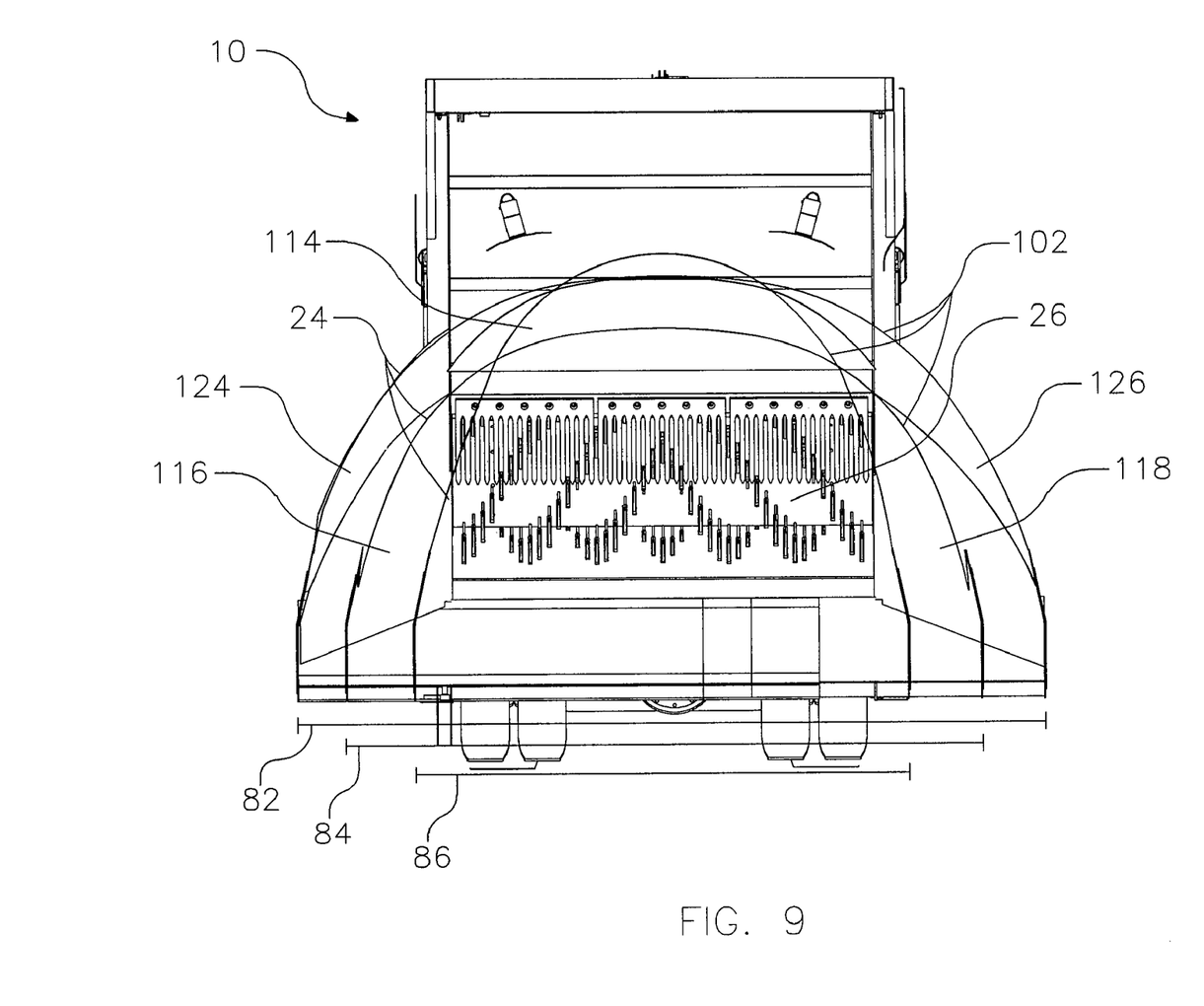
FIG. 9 is a rear view of a bagging machine.

Referring to FIG. 9, a rear view of the bagging machine 10 is illustrated showing the tunnel 24 in three example positions: the expanded state having a width 82 of approximately 14 feet, the retracted state having a width 84 of approximately 12 feet, and a further retracted state having a width 86 of approximately 118 inches. The rear view of the bagging machine 10 further illustrates the rotor 26 seen through the central cavity of the tunnel 24.

In addition, the bagging machine 10 and/or tunnel assembly may include one or more panels such as a central panel 114, a first side panel 116, and/or a second side panel 118. The panels 114, 116, and 118 may form part of the material bagging assembly and/or packing assembly 22 or may form part of the tunnel 24. The central panel 114 is in a corresponding shape with the central portion 102 of the tunnel 24. The central panel 114 may at least partially enclose the inner cavity of the expandable tunnel 24 near the central portion 102 at a forward end 120 (FIG. 7) of the expandable tunnel 24. The expandable tunnel 24 may also include a rearward end 122 (FIG. 7). The central panel 114 may be secured to any portion of the bagging machine 10 by means of a hinge or other pivoting connection capable of rotating and/or otherwise moving or adjusting the central panel 114 in relation to the forward end 120 of the tunnel 24. The position of the central panel 114 may need to be adjusted as the expandable tunnel 24 is expanded and/or collapsed. To facilitate movement control of the central panel 114, a hydraulic cylinder may also be secured to a portion of the central panel 114.

The first and/or second side panels 116 and/or 118 may respectively include first and/or second expandable side panels 124 and/or 126. The first and/or second side panels 124 and/or 126 may be raised and/or lowered in order in increase and/or decrease the overall surface area of the first and/or second side panels 116 and/or 118. The first and/or second side panels 116 and/or 118 operate similar to the central panel 114 in that they are used to at least partially enclose the inner cavity of the tunnel 24. The first and/or second side panels may be hinged to any portion of the mobile bagging machine 10 such that the first and/or second side panels 116 and/or 118 may rotate upon an axis or otherwise adjust their location and/or position with respect to either side of the front portion 120 of the tunnel 24. Thus, the first and/or second side panels 116 and/or 118 may be used and/or moved to accommodate various widths of the tunnel 24 as it expands and retracts.

The panels 114, 116, and/or 118 operate to further enclose the chamber of the tunnel 24 in order to prevent the material from escaping the tunnel 24 at the forward end 120. Panels 114, 116, and/or 118 and expandable side panels 124 and/or 126 may be formed of any material, for example, sheet metal, a metal alloy, a polymer, rubber, and/or another material capable of enclosing a space. A pliable, flexible, and/or malleable material with sufficient strength and/or rigidity to contain the material within the chamber of tunnel 24 may be preferable. Such material may move to accommodate the expanding and/or retracting of the tunnel 24 yet maintain sufficient enclosure for the material.

The claimed invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. A material bagging assembly for packing material into bags, the material bagging assembly comprising:
   an expandable base, and
   an expandable tunnel secured to the base, the tunnel comprising a first expandable portion and a second expandable portion;

wherein the base includes a first telescoping member and a second telescoping member;

wherein the first telescoping member resides at least partially in movable communication with the second telescoping member;

wherein the first telescoping member slides at least partially within the second telescoping member in a manner that changes the overall combined length of the first telescoping member and second telescoping member;

wherein the expandable tunnel includes:
a central portion,
a first end,
a first intermediate portion,
a second end, and
a second intermediate portion;

wherein the first intermediate portion is connected to both the first end and the central portion;

wherein the second intermediate portion is connected to both the second and and the central portion;

wherein the first expandable portion includes the first intermediate member;

wherein the second expandable portion includes the second intermediate member;

wherein the central portion is formed of pliable material;

wherein the first and second ends are formed of material that is more rigid than the material of the central portion;

wherein the first intermediate portion is hinged to both the first end and the central portion;

wherein the first intermediate portion rotates along substantially parallel hinges to form a fold between the first intermediate portion, the first end, and the central portion;

wherein the first intermediate portion folds inwardly toward the inner cavity of the tunnel, causing the central portion to overlap with the first end toward the inner cavity of the tunnel, thus placing the first expandable portion in a retracted state;

wherein the second intermediate portion is hinged to both the second end and the central portion;

wherein the second intermediate portion rotates along substantially parallel hinges to form a fold between the second intermediate portion, the second end, and the central portion; and wherein the second intermediate portion folds inwardly toward the inner cavity of the tunnel, causing the central portion to overlap with the second end toward the inner cavity of the tunnel, thus placing the second expandable portion in a retracted state.

2. The material bagging assembly of claim 1,
wherein the material is sent trough the expandable tunnel; and
wherein when the first and second expandable portions are in the retracted state, the material in the expandable tunnel forces the first and second expandable portions to remain in the retracted state, wherein:
the central portion is forced against the first and second intermediate portions,
the first intermediate portion is forced against the inner surface of the first end, and
the second intermediate portion is forced against the inner surface of the second end.

3. The material bagging assembly of claim 1, wherein the expandable tunnel, first expandable portion, and second expandable portion are configured to collapse from expanded states to collapsed states.

4. The material bagging assembly of claim 3,
wherein the expandable tunnel includes a first hinge stop and a second hinge step;
wherein the first hinge stop prevents the first intermediate portion from rotating away from the inner cavity of the tunnel beyond a substantially coplanar relationship with the first end when the first expandable portion is in the expanded state; and
wherein the second hinge stop prevents the second intermediate portion from rotating away from the inner cavity of the tunnel beyond a substantially coplanar relationship with the second end when the second expandable portion is in the expanded state.

5. The material bagging assembly of claim 4,
wherein the first and second telescoping members expand and telescope outwards when the expandable tunnel moves from the collapsed state to the expanded state, and
wherein the first and second telescoping members refract and telescope inwards when the expandable tunnel moves from the expanded slate to the collapsed state.

6. The material bagging assembly of claim 5,
wherein the expandable tunnel moves a bag having a fourteen-foot diameter when the expandable tunnel is in the expanded state, and
wherein the expandable tunnel fits a bag having a twelve-foot diameter when the expandable tunnel is in the collapsed state.

7. The material bagging assembly of claim 5,
wherein the expandable tunnel fits a large organic material packing bag when the expandable tunnel is in the expanded state, and
wherein the expandable tunnel fits a small organic material packing bag when the expandable tunnel is in the collapsed state.

8. The material bagging assembly of claim 5, wherein the expandable tunnel includes a forward end a rearward end, and wherein the material bagging assembly further comprises a central panel at the forward end of the expendable tunnel.

9. The material bagging assembly of claim 8, wherein the central panel corresponds in shape with the central portion, such that the central panel at least partially encloses the inner cavity of the expandable tunnel near the central portion at the forward end of the expandable tunnel.

10. The material bagging assembly of claim 9, wherein the malarial bagging assembly further comprises
a hinge attached to the central panel; and
a hydraulic cylinder attached to the central panel.

11. The material bagging assembly of claim 5, wherein the expandable tunnel includes a forward end a rearward end, and wherein the material bagging assembly further comprises a first side panel and a second side panel at the forward end of the expandable tunnel.

12. The material bagging assembly of claim 11,
wherein the first side panel expands and collapses to correspond in shape with the first end and at least a portion of the central panel, such that the first side panel at least partially encloses the inner cavity of the expandable tunnel near the first end and central portion at the forward end of the expandable tunnel; and
wherein the second side panel expands and collapses to correspond in shape with the second end and at least a portion of the central panel, such that the second side panel at least partially encloses the inner cavity of the expandable tunnel near the second end and central portion at the forward end of the expandable tunnel.

13. The material bagging assembly of claim 12,
wherein the first side panel includes a first expandable side panel that, when raised, expands the overall surface area of the first side panel enclosing the inner cavity; and
wherein the second side panel includes a second expandable side panel that, when raised, expands the overall surface area of the second side panel enclosing the inner cavity.

* * * * *